(12) United States Patent
Iwasa (10) Patent No.: US 8,858,377 B2
(45) Date of Patent: Oct. 14, 2014

(54) VEHICLE POWER TRANSMISSION DEVICE

(75) Inventor: Tomoatsu Iwasa, Los Angeles, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/997,491

(22) PCT Filed: Dec. 22, 2010

(86) PCT No.: PCT/JP2010/073205
§ 371 (c)(1),
(2), (4) Date: Sep. 10, 2013

(87) PCT Pub. No.: WO2012/086036
PCT Pub. Date: Jun. 28, 2012

(65) Prior Publication Data
US 2013/0345009 A1    Dec. 26, 2013

(51) Int. Cl.
| | |
|---|---|
| *F16H 3/72* | (2006.01) |
| *F16H 37/06* | (2006.01) |
| *F16H 57/021* | (2012.01) |
| *B60K 6/445* | (2007.10) |
| *B60K 6/405* | (2007.10) |
| *B60K 6/365* | (2007.10) |
| *F16H 57/02* | (2012.01) |
| *F16H 37/08* | (2006.01) |

(52) U.S. Cl.
CPC ...... *F16H 3/724* (2013.01); *F16H 2057/02034* (2013.01); *Y02T 10/6239* (2013.01); *F16H 2037/0866* (2013.01); *F16H 57/021* (2013.01); *B60K 6/445* (2013.01); *B60K 6/405* (2013.01); *B60K 6/365* (2013.01); *Y10S 903/902* (2013.01)
USPC ............... 475/5; 475/4; 180/65.22; 903/902

(58) Field of Classification Search
CPC ............... F16H 2200/0004; F16H 2200/2097
USPC ...................... 475/4, 5; 180/65.22
See application file for complete search history.

(56) References Cited

U.S. PATENT DOCUMENTS

| | | | |
|---|---|---|---|
| 6,786,843 B2 * | 9/2004 | Mizuno | 475/120 |
| 8,360,927 B2 * | 1/2013 | Murata et al. | 475/347 |
| 2002/0094898 A1 | 7/2002 | Hata et al. | |
| 2003/0069104 A1 | 4/2003 | Nakano et al. | |
| 2008/0261740 A1 | 10/2008 | Shimizu | |

FOREIGN PATENT DOCUMENTS

| | | |
|---|---|---|
| JP | A-11-63123 | 3/1999 |
| JP | A-2002-274201 | 9/2002 |
| JP | A-2003-106407 | 4/2003 |
| JP | A-2008-265517 | 11/2008 |
| JP | A-2009-286367 | 12/2009 |
| JP | A-2010-36820 | 2/2010 |
| JP | A-2010-83385 | 4/2010 |

* cited by examiner

*Primary Examiner* — Tisha Lewis
(74) *Attorney, Agent, or Firm* — Oliff PLC (57) ABSTRACT

A vehicle power transmission device includes: a first planetary gear device distributing power from an engine to a first electric motor and a cylindrical output member having an output gear disposed on a portion in an axial center line direction on an outer circumferential side; and a second planetary gear device having a second sun gear coupled to a second electric motor, a second carrier fixed to a case, and a second ring gear coupled to an inner circumference of the cylindrical output member to reduce and transmit output rotation of the second electric motor to the cylindrical output member, the cylindrical output member being supported via a bearing disposed on an inner circumferential side of the cylindrical output member by the second carrier fixed to the case.

2 Claims, 6 Drawing Sheets

VEHICLE POWER TRANSMISSION DEVICE

TECHNICAL FIELD

The present invention relates to a vehicle power transmission device and particularly to a technique for suppressing vibration and noise occurring in the vehicle power transmission device.

BACKGROUND ART

A vehicle power transmission device disposed between an engine and drive wheels is known. For example, this corresponds to those described in Patent Documents 1 to 4. Patent documents 1 and 2 describe a vehicle power transmission device including a first planetary gear device distributing power from the engine to a first electric motor and a cylindrical output member having an output gear disposed on a portion in an axial center line direction on the outer circumferential side, and a second planetary gear device having a second sun gear coupled to a second electric motor, a second carrier fixed to a case, and a second ring gear coupled to an inner circumference of the cylindrical output member to reduce and transmit output rotation of the second electric motor to the cylindrical output member.

PRIOR ART DOCUMENTS

Patent Documents

Patent Document 1: Japanese Laid-Open Patent Publication No. 2002-274201
Patent Document 2: Japanese Laid-Open Patent Publication No. 2010-083385
Patent Document 3: Japanese Laid-Open Patent Publication No. 2003-106407
Patent Document 4: Japanese Laid-Open Patent Publication No. 11-063123

SUMMARY OF THE INVENTION

Problem to Be Solved by the Invention

In the vehicle power transmission device of the type described in Patent Documents 1 and 2, the cylindrical output member is supported by the case via a pair of bearings respectively disposed on the outer circumferential side of one and the other ends of the cylindrical output member. Therefore, since a vibratory force input from the output gear, the second planetary gear device, etc., to the cylindrical output member is directly transmitted to the case, noise and vibration may easily occur. The pair of the bearings is disposed on the outer circumferential side of the cylindrical output member and therefore has a relatively large diameter, leading to a relatively large radial clearance. Therefore, since a portion of a meshing reaction force of the output gear acting on the cylindrical output member is input via the second ring gear of the second planetary gear device disposed on the inner circumferential side of the cylindrical output member to a pinion closer to a meshing point of the output gear out of a plurality of pinions included in the second planetary gear device, noise and vibration may easily occur due to a vibratory force generated from the deterioration of tooth contact between the pinion and the second ring gear.

The present invention was conceived in view of the situations and it is therefore an object of the present invention to provide a vehicle power transmission device capable of suppressing occurrence of noise and vibration.

Means for Solving the Problem

To achieve the object, the present invention provides (a) a vehicle power transmission device comprising: a first planetary gear device distributing power from an engine to a first electric motor and a cylindrical output member having an output gear disposed on a portion in an axial center line direction on an outer circumferential side; and a second planetary gear device having a second sun gear coupled to a second electric motor, a second carrier fixed to a case, and a second ring gear coupled to an inner circumference of the cylindrical output member to reduce and transmit output rotation of the second electric motor to the cylindrical output member, (b) the cylindrical output member being supported via a bearing disposed on an inner circumferential side of the cylindrical output member by the second carrier fixed to the case.

Effects of the Invention

Consequently, a vibratory force input to the cylindrical output member from the output gear of the cylindrical output member and the second planetary gear device disposed on the inner circumferential side of the cylindrical output member is attenuated by the second carrier before transmission to the case. Therefore, the vibratory force transmitted to the case is made smaller as compared to the case of directly transmitting the vibratory force to the case without passing through the second carrier. A meshing reaction force of the output gear acting on the cylindrical output member is transmitted via the second carrier and a carrier pin to each of a plurality of pinions included in the second planetary gear device. Therefore, the meshing reaction force is restrained from being input from the second ring gear to a portion of the plurality of the pinions in a biased manner, resulting in suppression of the generation of the vibratory force associated with deterioration of tooth contact between the portion of the pinions and the second ring gear. Thus, the vehicle power transmission device is acquired that can suppress the occurrence of noise and vibration.

Preferably, the bearing is disposed to partially or entirely overlap with the output gear when viewed in a direction orthogonal to the axial center line. Since this suppresses occurrence of misalignment of the cylindrical output member due to the meshing reaction force of the output gear, a portion of the meshing reaction force can be input via the second ring gear to a portion of the plurality of the pinions of the second planetary gear device so as to suppress the deterioration of tooth contact between the portion of the pinions and the second ring gear. Therefore, since the generation of the vibratory force associated with the deterioration of tooth contact between the portion of the pinions and the second ring gear is suppressed, the occurrence of noise and vibration can be suppressed.

Preferably, the first planetary gear device includes the first sun gear coupled to the first electric motor, the first carrier coupled to the engine, and the first ring gear coupled to the cylindrical output member, and the cylindrical output member includes the first ring gear and the second ring gear on the inside of the both end portions in the axial center line direction while the bearing is disposed between the first ring gear and the second ring gear in the axial center line direction. As a result, the dimension of the vehicle power transmission device can be reduced in the axial center line direction and the vehicle power transmission device can compactly be configured.

Preferably, the cylindrical output member is supported via the single bearing by the second carrier. As a result, as compared to the case of the cylindrical output member configured to be supported via a plurality of bearings, the parts count can be reduced and the manufacturing cost of the vehicle power transmission device can be reduced.

BEST MODES FOR CARRYING OUT THE INVENTION

An embodiment of the present invention will now be described in detail with reference to the drawings. In the following embodiment, the figures are simplified or deformed as needed and portions are not necessarily precisely depicted in terms of dimension ratio, shape, etc.

First Embodiment

Figure 1:
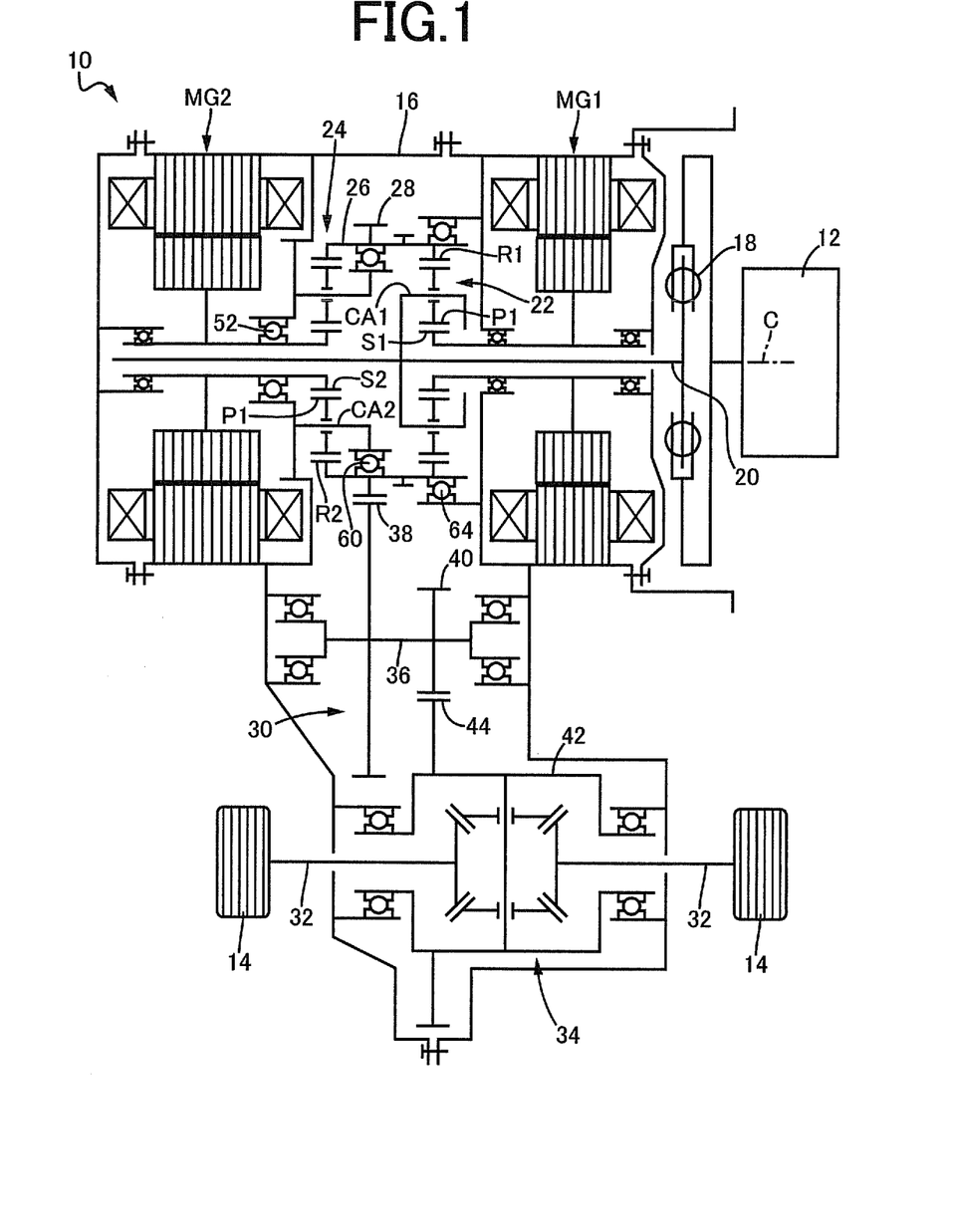
FIG. 1 is a schematic for explaining a vehicle power transmission device of one embodiment of the present invention.

FIG. 1 is a schematic for explaining a configuration of a vehicle power transmission device 10 of one embodiment of the present invention. In FIG. 1, the power transmission device 10 is disposed on a power transmission path between an engine 12 and drive wheels 14 on a hybrid vehicle of the FF (front-engine front-drive) type, for example. The power transmission device 10 includes, in a transaxle case 16 attached to a vehicle body, a damper 18 absorbing pulsation due to fluctuations of torque from the engine 12, and an input shaft 20 coupled via the damper 18 to the engine 12, as well as a first motor generator MGI, a first planetary gear device 22, a second planetary gear device 24, and a second motor generator MG2 disposed in this order from the damper 18 side on the outer circumferential side of the input shaft 20. The transaxle case 16 corresponds to a case of the present invention. The first motor generator MGI corresponds to a first electric motor of the present invention. The second motor generator MG2 corresponds to a second electric motor of the present invention.

The first planetary gear device 22 is a single pinion type planetary gear device having a first sun gear S1 coupled to the first motor generator MG1, a first ring gear R1 integrally disposed on an end portion on the first planetary gear device 22 side of a cylindrical output member 26 disposed on the outer circumferential side of the first planetary gear device 22 and the second planetary gear device 24, a first pinion P1 meshed with each of the first sun gear Si and the first ring gear R1 on the outer circumferential side of the first sun gear S1 and the inner circumferential side of the first ring gear R1, and a first carrier CA1 coupled to the input shaft 20 and supporting the first pinion P1 rotatably and revolvably around an axial center line C. The first planetary gear device 22 acts as a power distribution mechanism mechanically distributing the power from the engine 12 to the first motor generator MG1 and the cylindrical output member 26. The power of the engine 12 distributed by the first planetary gear device 22 to the first motor generator MG1 is used for driving the first motor generator MG1 as an electric generator. The power of the engine 12 distributed by the first planetary gear device 22 to the cylindrical output member 26 is used for rotationally driving the drive wheels 14. An intermediate portion of the cylindrical output member 26 in the axial center line C direction is integrally disposed with a first drive gear 28 consisting of outer circumferential teeth located between the first ring gear R1 of the first planetary gear device 22 and a second ring gear R2 of the second planetary gear device 24 in the axial center line C direction.

The first motor generator MG1 is driven by the engine 12 via the first planetary gear device 22 to act as an electric generator and charges, for example, an electric storage device such as a battery with electric energy generated by the electric generation. The first motor generator MG1 drives the engine 12 via the first planetary gear device 22, for example, at the engine start, thereby acting as an electric motor (engine starter).

A differential state of the first planetary gear device 22 is continuously varied by controlling the operating state of the first motor generator MG1. Therefore, the first planetary gear device 22 and the first motor generator MG1 make up an electric transmission portion varying a rotation speed of the cylindrical output member 26 in a stepless manner by continuously varying the differential state of the first planetary gear device 22 through the control of the operating state of the first motor generator MG1. The first drive gear 28 formed on the cylindrical output member 26 is allowed to function as an output gear of the electric transmission portion and corresponds to an output gear of the present invention.

The second planetary gear device 24 is a single pinion type planetary gear device having a second sun gear S2 coupled to the second motor generator MG2, the second ring gear R2 integrally coupled to an end portion on the second planetary gear device 24 side of the cylindrical output member 26, a plurality of second pinions P2 meshed with each the second sun gear S2 and the second ring gear R2 on the outer circumferential side of the second sun gear S2 and the inner circumferential side of the second ring gear R2, and a second carrier CA2 fixed to the transaxle case 16 and supporting a plurality of the second pinions P2 rotatably and revolvably around the axial center line C. The second planetary gear device 24 acts as a motor reduction mechanism reducing and transmitting the output rotation of the second motor generator MG2 with amplified drive power to the cylindrical output member 26.

The second motor generator MG2 functions as an electric motor rotationally driving the drive wheels 14 by itself or along with the engine 12. The second motor generator MG2 is driven by the drive wheels 14, for example, during reduction of the vehicle speed, to function as an electric generator and charges, for example, an electric storage device such as a battery with electric energy generated by the electric generation.

The power transmission device 10 includes a reduction gear device 30 reducing and outputting the rotation speed of the cylindrical output member 26, and a well-known differential gear device 34 distributing the power transmitted from the reduction gear device 30 to a pair of left and right axles 32 while allowing a rotation difference therebetween. The reduction gear device 30 is made up of the first drive gear 28, a first driven gear 38 integrally disposed with a counter shaft 36 disposed in parallel with the input shaft 20 to be meshed with the first drive gear 28, a second drive gear 40 integrally disposed with the counter shaft 36; and a second driven gear 44 fixed to the outer circumferential side of a differential case 42 of the differential gear device 34 to be meshed with the second drive gear 40.

The power transmission device 10 configured as described above uses the first motor generator MG1 to start the engine 12 at the engine start, for example. The power transmission device 10 uses the second motor generator MG2 to drive the drive wheels 14 at the start of the vehicle. During steady running of the vehicle, the power transmission device 10 distributes the power of the engine 12 through the first planetary gear device 22 to the cylindrical output member 26 and the first motor generator MG1 to drive the drive wheels 14 with a portion of the power distributed to the cylindrical output member 26 while causing the first motor generator MG1 to generate electricity from the other portion of the power distributed to the first motor generator MG1 so that the second motor generator MG2 is driven by electric power acquired from the electric generation, thereby assisting the power of the engine 12. During deceleration and braking of the vehicle, the second motor generator MG2 is rotated by the power transmitted from the drive wheels 14 to generate electricity, thereby converting kinetic energy into electric energy to be collected in the electric storage device.

Figure 2:
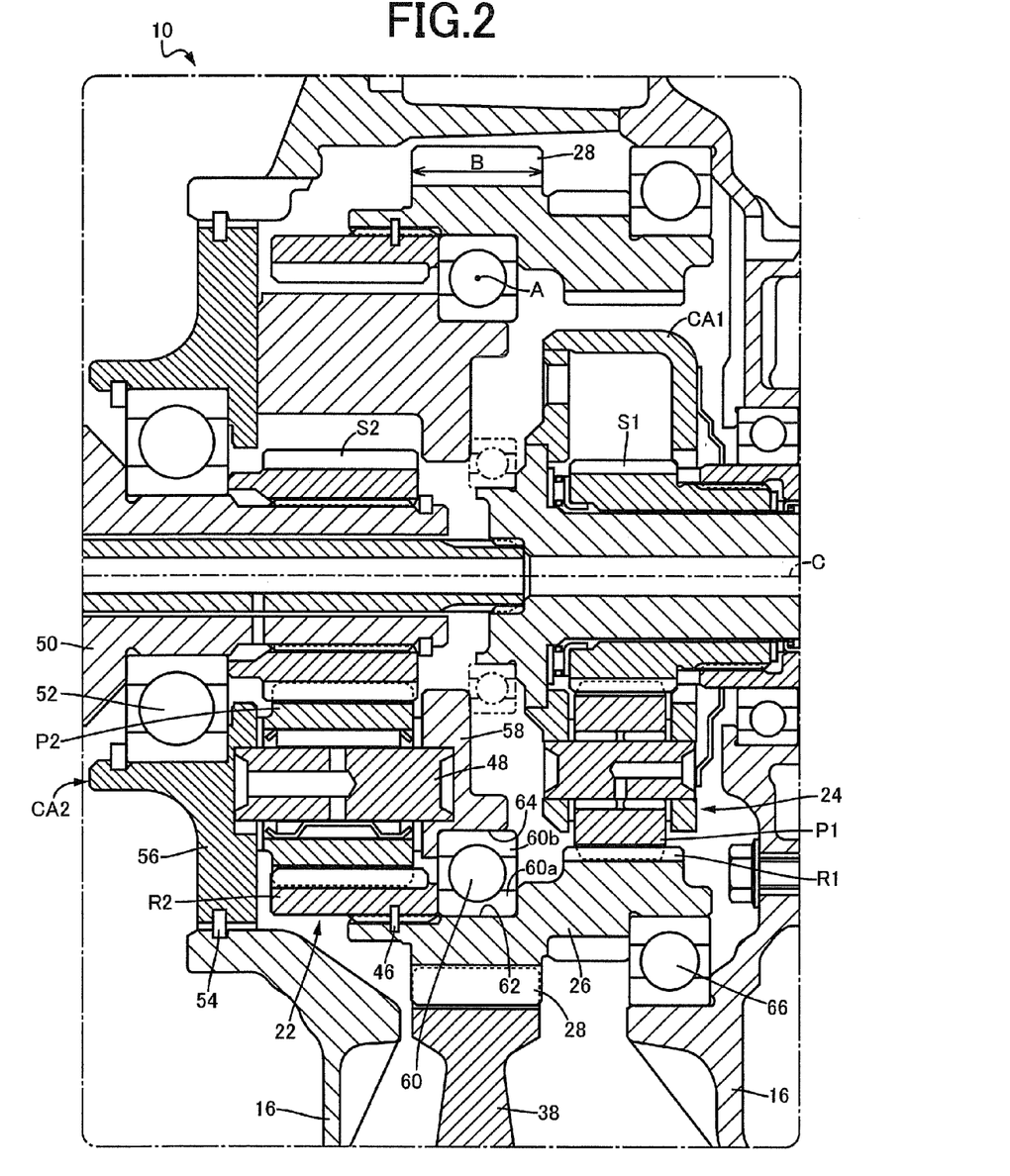
FIG. 2 is an enlarged cross-sectional view of a portion of the vehicle power transmission device of FIG. 1 including a first planetary gear device, a second planetary gear device, and a cylindrical output member.

FIG. 2 is an enlarged cross-sectional view of a portion of the power transmission device 10 of FIG. 1 including the first planetary gear device 22, the second planetary gear device 24, and the cylindrical output member 26. A supporting structure of the cylindrical output member 26 will hereinafter be described in detail with reference to FIG. 2.

As depicted in FIG. 2, the cylindrical output member 26 includes the first ring gear R1 and the second ring gear R2 on the inner circumferential side of the both respective end portions in the axial center line C direction. The first ring gear R1 is integrally disposed on the inner circumferential side of the end portion on the first planetary gear device 22 side of the cylindrical output member 26. The second ring gear R2 consists of an annular member spline-fitted to the inner circumferential side of the end portion on the second planetary gear device 24 side of the cylindrical output member 26 and fixed by a snap ring 46 unmovably in the axial center line C direction. The cylindrical output member 26 is a compound gear member integrally disposed with each of the first ring gear R1, the second ring gear R2, and the first drive gear 28.

The second carrier CA2 of the second planetary gear device 24 is made up of a disk-shaped first carrier member 56 that supports an end portion on the second motor generator MG2 side of a carrier pin 48 rotatably supporting the second pinion P2, that is supported via a first bearing 52 by a rotor shaft 50 of the second motor generator MG2, and that is fitted non-rotatably around the axial center line C to the transaxle case 16 while being fixed by a snap ring 54 unmovably in the axial center line C direction, and a second carrier member 58 that has a disk-shaped member supporting an end portion on the first planetary gear device 22 side of the carrier pin 48 and that is coupled to the first carrier member 56.

The cylindrical output member 26 is rotatably supported by the second carrier member 58 of the second carrier CA2 fixed to the transaxle case 16, via a second bearing 60 that is a ball bearing disposed to entirely overlap with the first drive gear (output gear) 28 when viewed in a direction orthogonal to the axial center line C on the inner circumferential side of the cylindrical output member 26. As a result, a vibratory force input to the cylindrical output member 26 is transmitted via the second carrier CA2 to the transaxle case 16. A meshing reaction force of the first drive gear 28 acting on the cylindrical output member 26 is transmitted via the second carrier CA2 and the carrier pin 48 to each of a plurality of the second pinions P2 without passing through the second ring gear R2. The second bearing 60 corresponds to a bearing of the present invention and is disposed between the first ring gear R1 and the second ring gear R2 with an outer ring 60a fitted into an outer ring fitting surface 62 formed on the inside of the cylindrical output member 26 and sandwiched by a stepped portion end surface of the cylindrical output member 26 and the second ring gear R2 and with an inner ring 60b fitted into an inner ring fitting surface 64 formed on the outside of the second carrier member 58.

The second bearing 60 is positioned directly below the meshing position between the first drive gear 28 and the first driven gear 38. The term "directly below" means that a center A of the second bearing 60 is located within a tooth width B of the first drive gear 28 in the axial center line C direction. As compared to the case that the second bearing 60 is not positioned directly below the meshing position between the first drive gear 28 and the first driven gear 38, this suppresses the occurrence of misalignment of the cylindrical output member 26 due to the meshing reaction force applied to the first drive gear 28.

The cylindrical output member 26 is supported by the transaxle case 16 via a third bearing 66 radially overlapped with the first ring gear R1 on the outer circumferential side of the end portion on the first planetary gear device 24 side.

According to the vehicle power transmission device 10 of this embodiment, the vehicle power transmission device 10 includes the first planetary gear device 22 distributing the power from the engine 12 to the first motor generator (first electric motor) MG1 and the cylindrical output member 26 having the first drive gear 28 acting as the output gear on the outer circumferential side disposed on a portion in the axial center line C direction, and the second planetary gear device 24 having the second sun gear S2 coupled to the second motor generator (second electric motor) MG2, the second carrier CA2 fixed to the transaxle case (case) 16, and the second ring gear R2 coupled to the inner circumference of the cylindrical output member 26 to reduce and transmit the output rotation of the second motor generator MG2 to the cylindrical output member 26, and the cylindrical output member 26 is supported by the second carrier CA2 fixed to the transaxle case 16 via the second bearing (bearing) 60 disposed on the inner circumferential side of the cylindrical output member 26. As a result, the vibratory force input to the cylindrical output member 26 from the first drive gear 28 of the cylindrical output member 26 and the second planetary gear device 24 disposed on the inner circumferential side of the cylindrical output member 26 is attenuated by the second carrier CA2 before transmission to the transaxle case 16. Therefore, the vibratory force transmitted to the transaxle case 16 is made smaller as compared to the case of directly transmitting the vibratory force to the transaxle case 16 without passing through the second carrier CA2. The meshing reaction force of the first drive gear 28 acting on the cylindrical output member 26 is transmitted via the second carrier CA2 and the carrier pin 48 to each of a plurality of the second pinions P2. Therefore, the meshing reaction force is restrained from being input from the second ring gear R2 to a portion of the plurality of the second pinions P2 in a biased manner, resulting in suppression of the generation of the vibratory force associated with deterioration of tooth contact between the portion of the second pinions P2 and the second ring gear R2. Thus, the vehicle power transmission device 10 is acquired that can suppress the occurrence of noise and vibration.

According to the vehicle power transmission device 10 of this embodiment, the second bearing 60 is disposed to partially or entirely overlap with the first drive gear 28 when viewed in the direction orthogonal to the axial center line C. Since this suppresses occurrence of misalignment of the cylindrical output member 26 due to the meshing reaction force of the first drive gear 28, a portion of the meshing reaction force can be input via the second ring gear R2 to a portion of the plurality of the second pinions P2 so as to suppress the deterioration of tooth contact between the portion of the second pinions P2 and the second ring gear R2. Therefore, since the generation of the vibratory force associated with the deterioration of tooth contact between the portion of the second pinions P2 and the second ring gear R2 is suppressed, the occurrence of noise and vibration can be suppressed.

According to the vehicle power transmission device 10 of this embodiment, the first planetary gear device 22 includes the first sun gear S1 coupled to the first motor generator (first electric motor) MG1, the first carrier CA1 coupled to the engine 12, and the first ring gear R1 coupled to the cylindrical output member 26, and the cylindrical output member 26 includes the first ring gear R1 and the second ring gear R2 on the inside of the both end portions in the axial center line C direction while the second bearing 60 is disposed between the first ring gear R1 and the second ring gear R2 in the axial center line C direction. As a result, the dimension of the vehicle power transmission device 10 can be reduced in the axial center line direction and the vehicle power transmission device 10 can compactly be configured.

According to the vehicle power transmission device 10 of this embodiment, since the second bearing 60 is disposed on the inner circumferential side of the cylindrical output member 26 and, therefore, the second bearing 60 can be reduced in diameter as compared to the case of disposing the second bearing 60 on the outer circumferential side of the cylindrical output member 26 and, therefore, the manufacturing cost of the vehicle power transmission device 10 can be reduced.

Figure 5:
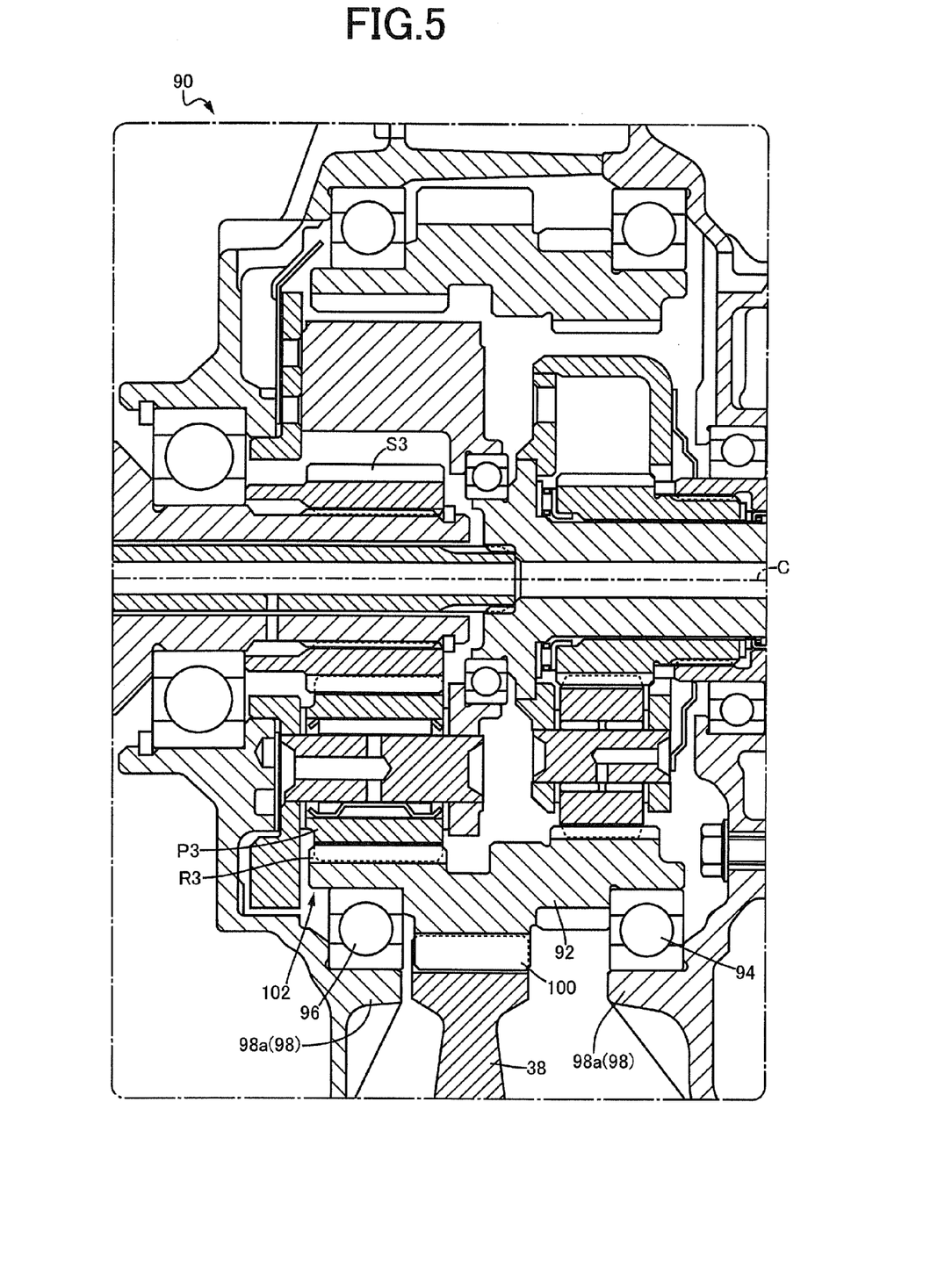
FIG. 5 is a cross-sectional view of a conventional vehicle power transmission device, corresponding to FIG. 2 of the first embodiment.

A conventional vehicle power transmission device 90 as depicted in FIG. 5 is configured such that a cylindrical output member 92 is supported by a transaxle case 98 via a pair of bearings 94 and 96 respectively disposed on the outer circumferential side of one end portion and the other end portion of the cylindrical output member 92 and, therefore, the vibratory force input to the cylindrical output member 92 is directly transmitted to the transaxle case 98 and noise and vibration may easily occur. The pair of the bearing 94 and 96 is fitted to fitting portions 98a of the transaxle case 98 and the fitting portions 98a are located near an outer circumferential surface of the transaxle case 98, which are portions having a higher transmission sensitivity to the vibratory force in the transaxle case 98 and, therefore, noise and vibration are more likely to occur.

Figure 6:
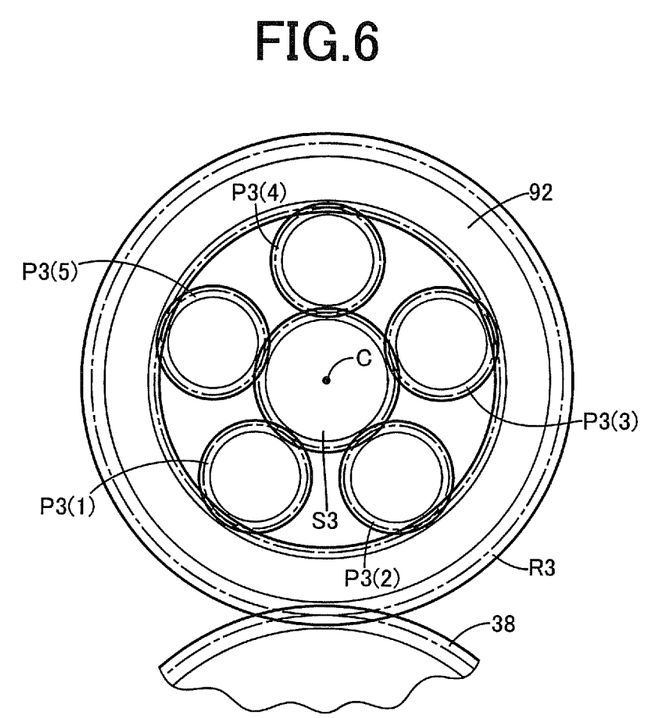
FIG. 6 is a diagram conceptually depicting a first drive gear of the cylindrical output member, a first driven gear meshed therewith, and a second planetary gear device disposed on the inner circumferential side of the cylindrical output member in FIG. 5 viewed in the axial center line direction.

The pair of the bearing 94 and 96 is disposed on the outer circumferential side of the cylindrical output member 92 and therefore has a diameter larger than the second bearing 60 of this embodiment, which makes a radial clearance relatively larger. Therefore, as depicted in FIG. 6 conceptually depicting a first drive gear 100 of the cylindrical output member 92, a first driven gear 38 meshed therewith, and a second planetary gear device 102 disposed on the inner circumferential side of the cylindrical output member 92 viewed in the axial center line C direction, a portion of the meshing reaction force of the first drive gear 100 is input via a ring gear R3 of the second planetary gear device 102 disposed on the inner circumferential side of the first drive gear 100 to gears of a plurality of pinions P3(1) to P3(5) included in the second planetary gear device 102 closer to the meshing point of the first drive gear 100, i.e., the pinions P3(1) and P3(2) closer to the first driven gear 38, in a relatively larger amount. Therefore, in the conventional vehicle power transmission device 90, noise and vibration may easily occur due to the vibratory force generated from the deterioration of the tooth contact between the pinions P3(1) and P3(2) and the ring gear R3.

In the conventional vehicle power transmission device 90, the meshing position between the first drive gear 100 and the first driven gear 38 meshed therewith is located closer to the second planetary gear device 102 between the pair of the bearings 94 and 96 in the axial center line C direction of the cylindrical output member 92. Therefore, the misalignment of the cylindrical output member 92 due to the meshing reaction force of the first drive gear 100 acting on the cylindrical output member 92 is made larger, and a portion of the meshing reaction force is input to the pinions P3 of the second planetary gear device 102, which may deteriorate the tooth contact of the pinions P3 with a sun gear S3 and the ring gear R3. Therefore, noise and vibration may easily occur.

Second Embodiment

Other embodiments of the present invention will be described. In the description of the following embodiments, the portions common to the embodiments are denoted by the same reference numerals and will not be described.

Figure 3:
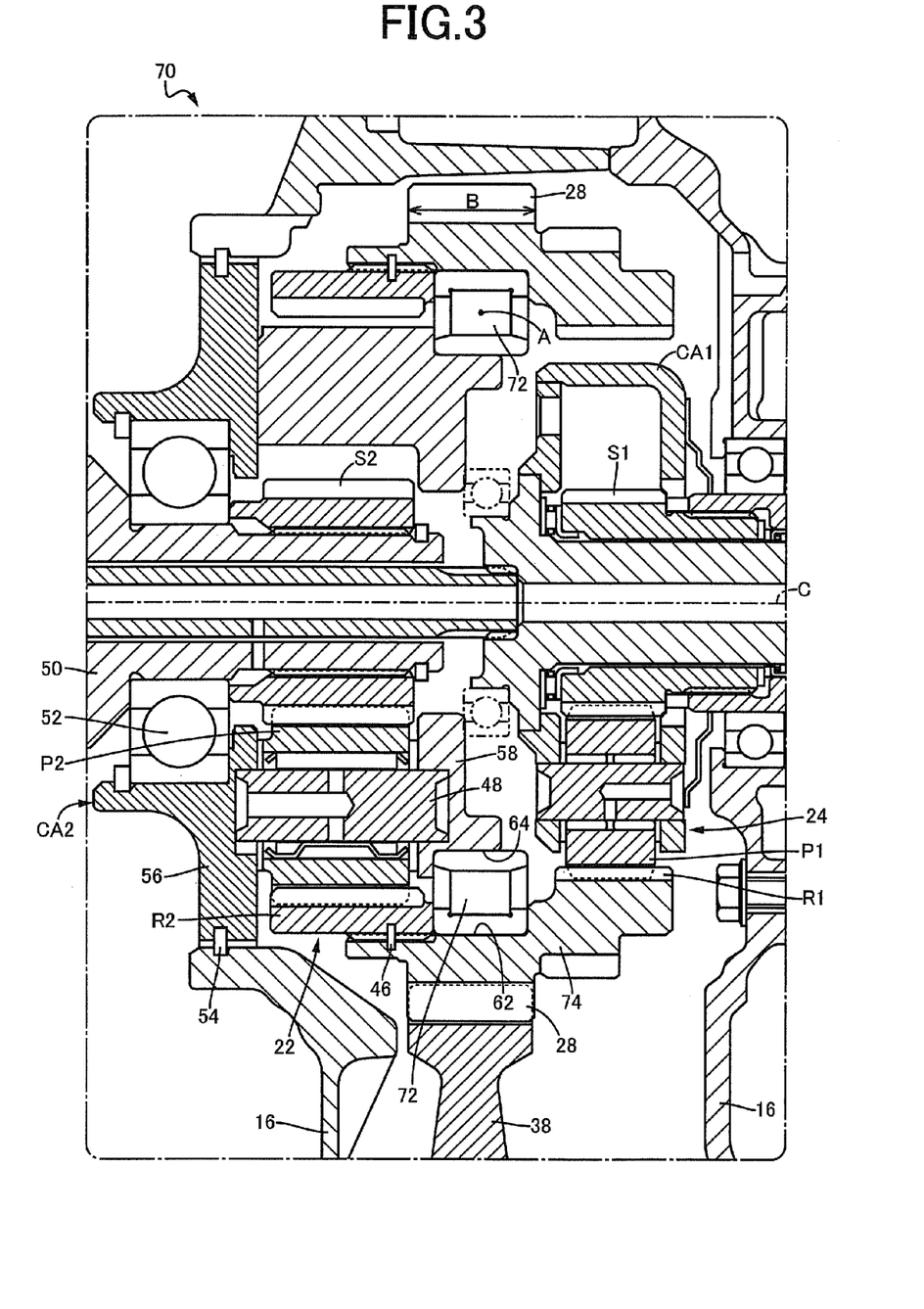
FIG. 3 is a cross-sectional view of a main portion of a vehicle power transmission device of another embodiment of the present invention with using a cylindrical roller bearing as a second bearing, corresponding to FIG. 2 of the first embodiment.

FIG. 3 is a cross-sectional view of a main portion of a vehicle power transmission device 70 of another embodiment of the present invention, corresponding to FIG. 2 of the first embodiment. As depicted in FIG. 3, in this embodiment, the second bearing 60 of the first embodiment is replaced with a second bearing 72 that is a cylindrical roller bearing. The second bearing 72 corresponds to the bearing of the present invention and is disposed between the first ring gear R1 and the second ring gear R2 on the inner circumferential side of a cylindrical output member 74 of this embodiment. The cylindrical output member 74 is rotatably supported by the second carrier member 58 of the second carrier CA2 fixed to the transaxle case 16, via the second bearing 72 disposed to entirely overlap with the first drive gear 28 when viewed in the direction orthogonal to the axial center line C on the inner circumferential side of the cylindrical output member 74.

The second bearing 72 is positioned directly below the meshing position between the first drive gear 28 and the first driven gear 38. As compared to the case that the second bearing 72 is not positioned directly below the meshing position between the first drive gear 28 and the first driven gear 38, this suppresses the occurrence of misalignment of the cylindrical output member 74 due to the meshing reaction force applied to the first drive gear 28.

In this embodiment, the cylindrical output member 74 is supported via the single second bearing 72 by the second carrier CA2. Therefore, the third bearing 66 of the first embodiment is not provided According to the vehicle power transmission device 70 of this embodiment, the cylindrical output member 74 is supported by the second carrier CA2 fixed to the transaxle case 16 via the second bearing (bearing) 72 disposed on the inner circumferential side of the cylindrical output member 74. As a result, the vibratory force input to the cylindrical output member 74 from the first drive gear 28 of the cylindrical output member 74 and the second planetary gear device 24 disposed on the inner circumferential side of the cylindrical output member 74 is attenuated by the second carrier CA2 before transmission to the transaxle case 16. Therefore, the vibratory force transmitted to the transaxle case 16 is made smaller as compared to the case of directly transmitting the vibratory force to the transaxle case 16 without passing through the second carrier CA2. The meshing reaction force of the first drive gear 28 acting on the cylindrical output member 74 is transmitted via the second carrier CA2 and the carrier pin 48 to each of a plurality of the second pinions P2. Therefore, the meshing reaction force is restrained from being input from the second ring gear R2 to a portion of the plurality of the second pinions P2 in a biased manner, resulting in suppression of the generation of the vibratory force associated with deterioration of tooth contact between the portion of the second pinions P2 and the second ring gear R2. Thus, the vehicle power transmission device 70 is acquired that can suppress the occurrence of noise and vibration as is the case of the first embodiment.

According to the vehicle power transmission device 70 of this embodiment, the second bearing 72 is disposed to partially or entirely overlap with the first drive gear 28 when viewed in the direction orthogonal to the axial center line C. Since this suppresses occurrence of misalignment of the cylindrical output member 74 due to the meshing reaction force of the first drive gear 28, a portion of the meshing reaction force can be input via the second ring gear R2 to a portion of the plurality of the second pinions P2 so as to suppress the deterioration of tooth contact between the portion of the second pinions P2 and the second ring gear R2. Therefore, since the generation of the vibratory force associated with the deterioration of tooth contact between the portion of the second pinions P2 and the second ring gear R2 is suppressed, the occurrence of noise and vibration can be suppressed as is the case of the first embodiment.

According to the vehicle power transmission device 70 of this embodiment, the first planetary gear device 22 includes the first sun gear S1 coupled to the first motor generator (first electric motor) MG1, the first carrier CA1 coupled to the engine 12, and the first ring gear R1 coupled to the cylindrical output member 74, and the cylindrical output member 74 includes the first ring gear RI and the second ring gear R2 on the inside of the both end portions in the axial center line C direction while the second bearing 72 is disposed between the first ring gear R1 and the second ring gear R2 in the axial center line C direction. As a result, the dimension of the vehicle power transmission device 70 can be reduced in the axial center line direction and the vehicle power transmission device 70 can compactly be configured, as is the case of the first embodiment.

According to the vehicle power transmission device 70 of this embodiment, since the second bearing 72 is disposed on the inner circumferential side of the cylindrical output member 74 and, therefore, the second bearing 72 can be reduced in diameter as compared to the case of disposing the second bearing 72 on the outer circumferential side of the cylindrical output member 74 and, therefore, the manufacturing cost of the vehicle power transmission device 70 can be reduced as is the case of the first embodiment.

According to the vehicle power transmission device 70 of this embodiment, the cylindrical output member 74 is supported via the single second bearing 72 by the second carrier CA2. As a result, as compared to the case of the cylindrical output member 74 configured to be supported via a plurality of bearings, the parts count can be reduced and the manufacturing cost of the vehicle power transmission device 70 can be reduced.

Third Embodiment

Figure 4:
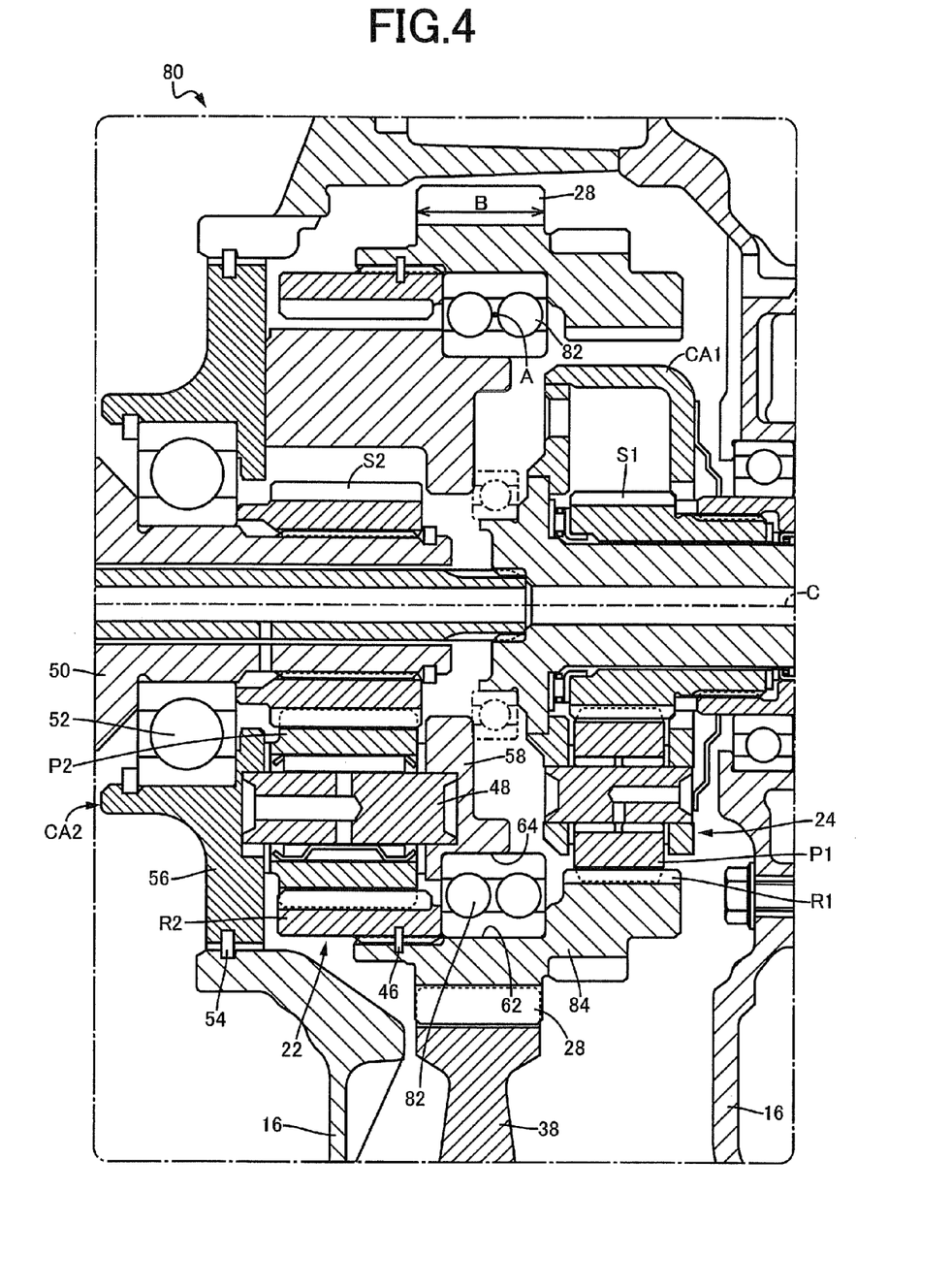
FIG. 4 is a cross-sectional view of a main portion of a vehicle power transmission device of another embodiment of the present invention with using a double row ball bearing as the second bearing, corresponding to FIG. 2 of the first embodiment.

FIG. 4 is a cross-sectional view of a main portion of a vehicle power transmission device 80 of another embodiment of the present invention, corresponding to FIG. 2 of the first embodiment. As depicted in FIG. 4, in this embodiment, the second bearing 60 of the first embodiment is replaced with a second bearing 82 that is a double row ball bearing. The second bearing 82 corresponds to the bearing of the present invention and is disposed between the first ring gear R1 and the second ring gear R2 on the inner circumferential side of a cylindrical output member 84 of this embodiment. The cylindrical output member 84 is rotatably supported by the second carrier member 58 of the second carrier CA2 fixed to the transaxie case 16, via the second bearing 82 disposed to entirely overlap with the first drive gear 28 when viewed in the direction orthogonal to the axial center line C on the inner circumferential side of the cylindrical output member 84.

The second bearing 82 is positioned directly below the meshing position between the first drive gear 28 and the first driven gear 38. As compared to the case that the second bearing 82 is not positioned directly below the meshing position between the first drive gear 28 and the first driven gear 38, this suppresses the occurrence of misalignment of the cylindrical output member 84 due to the meshing reaction force applied to the first drive gear 28.

In this embodiment, the cylindrical output member 84 is supported via the single second bearing 82 by the second carrier CA2. Therefore, the third bearing 66 of the first embodiment is not provided.

According to the vehicle power transmission device 80 of this embodiment, the cylindrical output member 84 is supported by the second carrier CA2 fixed to the transaxle case 16 via the second bearing (bearing) 82 disposed on the inner circumferential side of the cylindrical output member 84. As a result, the vibratory force input to the cylindrical output member 84 from the first drive gear 28 of the cylindrical output member 84 and the second planetary gear device 24 disposed on the inner circumferential side of the cylindrical output member 84 is attenuated by the second carrier CA2 before transmission to the transaxle case 16. Therefore, the vibratory force transmitted to the transaxle case 16 is made smaller as compared to the case of directly transmitting the vibratory force to the transaxle case 16 without passing through the second carrier CA2. The meshing reaction force of the first drive gear 28 acting on the cylindrical output member 84 is transmitted via the second carrier CA2 and the carrier pin 48 to each of a plurality of the second pinions P2. Therefore, the meshing reaction force is restrained from being input from the second ring gear R2 to a portion of the plurality of the second pinions P2 in a biased manner, resulting in suppression of the generation of the vibratory force associated with deterioration of tooth contact between the portion of the second pinions P2 and the second ring gear R2. Thus, the vehicle power transmission device 80 is acquired that can suppress the occurrence of noise and vibration as is the case of the first embodiment.

According to the vehicle power transmission device 80 of this embodiment, the second bearing 82 is disposed to partially or entirely overlap with the first drive gear 28 when viewed in the direction orthogonal to the axial center line C. Since this suppresses occurrence of misalignment of the cylindrical output member 84 due to the meshing reaction force of the first drive gear 28, a portion of the meshing reaction force can be input via the second ring gear R2 to a portion of the plurality of the second pinions P2 so as to suppress the deterioration of tooth contact between the portion of the second pinions P2 and the second ring gear R2. Therefore, since the generation of the vibratory force associated with the deterioration of tooth contact between the portion of the second pinions P2 and the second ring gear R2 is suppressed, the occurrence of noise and vibration can be suppressed as is the case of the first embodiment.

According to the vehicle power transmission device 80 of this embodiment, the first planetary gear device 22 includes the first sun gear S1 coupled to the first motor generator (first electric motor) MG1, the first carrier CA1 coupled to the engine 12, and the first ring gear R1 coupled to the cylindrical output member 84, and the cylindrical output member 84 includes the first ring gear R1 and the second ring gear R2 on the inside of the both end portions in the axial center line C direction while the second bearing 82 is disposed between the first ring gear R1 and the second ring gear R2 in the axial center line C direction. As a result, the dimension of the vehicle power transmission device 80 can be reduced in the axial center line direction and the vehicle power transmission device 80 can compactly be configured, as is the case of the first embodiment.

According to the vehicle power transmission device 80 of this embodiment, since the second bearing 82 is disposed on the inner circumferential side of the cylindrical output member 84 and, therefore, the second bearing 82 can be reduced in diameter as compared to the case of disposing the second bearing 82 on the outer circumferential side of the cylindrical output member 84 and, therefore, the manufacturing cost of the vehicle power transmission device 80 can be reduced as is the case of the first embodiment.

According to the vehicle power transmission device 80 of this embodiment, the cylindrical output member 84 is supported via the single second bearing 82 by the second carrier CA2. As a result, as compared to the case of the cylindrical output member 84 configured to be supported via a plurality of bearings, the parts count can be reduced and the manufacturing cost of the vehicle power transmission device 80 can be reduced as is the case of the second embodiment.

Although the exemplary embodiments of the present invention have been described in detail with reference to the drawings, the present invention is not limited to these embodiments and may be implemented in other forms.

For example, although the second bearing 60 is disposed to entirely overlap with the first drive gear 28 when viewed in the direction orthogonal to the axial center line C in the embodiment, this is not a limitation and the second bearing 60 may be disposed to partially overlap with the first drive gear 28 when viewed in the direction orthogonal to the axial center line C. Even in this case, the effect of suppressing a tilt of the cylindrical output member 26 is acquired.

Although the first drive gear 28 is disposed on the intermediate portion of the cylindrical output member 26 in the axial center line C direction and the first ring gear R1 and the second ring gear R2 are disposed on the both respective end portions of the cylindrical output member 26 in the axial center line C direction in the embodiments, this is not a limitation and, for example, the first drive gear 28 may be disposed on one end portion of the cylindrical output member 26 in the axial center line C direction and the first ring gear R1 and the second ring gear R2 may respectively be disposed on the other end portion and the intermediate portion of the cylindrical output member 26 in the axial center line C direction. In short, the first drive gear 28 only needs to be disposed on a portion of the cylindrical output member 26 in the axial center line C direction as outer circumferential teeth and radially overlapped with the second bearing 60 disposed on the inner circumferential side.

Although the embodiments are implemented by using the second bearing 60 that is a single row ball bearing, the second bearing 72 that is a cylindrical roller bearing, and the second bearing 82 that is a double row ball bearing, other types of bearings may be used instead thereof.

Although the first ring gear R1 is disposed integrally with the cylindrical output member 26 in the embodiments, this is not a limitation and, for example, the first ring gear R1 may be disposed separately from the cylindrical output member 26 and coupled non-rotatably to the cylindrical output member 26.

Although the second ring gear R2 is disposed separately from the cylindrical output member 26 in the embodiments, this is not a limitation and, for example, the second ring gear R2 may be disposed integrally with the cylindrical output member 26.

Although each of the first planetary gear device 22 and the second planetary gear device 24 disposed on the inner circumferential side of the cylindrical output member 26 is a single pinion type planetary gear device in the embodiments, this is not a limitation. For example, the first planetary gear device 22 and the second planetary gear device 24 may be made up of a plurality of planetary gear devices of the single pinion type, the double pinion type, etc.

The described embodiments are merely exemplary embodiments and, although not exemplarily illustrated one by one, the present invention may be implemented in variously modified and improved forms based on the knowledge of those skilled in the art without departing from the spirit thereof.

EXPLANATIONS OF LETTERS OR NUMERALS 10, 70, 80: vehicle power transmission device
12: engine
16: transaxle case (case)
22: first planetary gear device
24: second planetary gear device
26, 74, 84: cylindrical output member
28: first drive gear (output gear)
60, 72, 82: second bearing (bearing)
C: axial center line (axial center line of the cylindrical output member)
CA2: second carrier
MG1: first motor generator (first electric motor)
MG2: second motor generator (second electric motor)
R2: second ring gear
S2: second sun gear

The invention claimed is:

1. A vehicle power transmission device comprising: a first planetary gear device distributing power from an engine to a first electric motor and a cylindrical output member having an output gear disposed on a portion in an axial center line direction on an outer circumferential side; and a second planetary gear device having a second sun gear coupled to a second electric motor, a second carrier fixed to a case, and a second ring gear coupled to an inner circumference of the cylindrical output member to reduce and transmit output rotation of the second electric motor to the cylindrical output member, the cylindrical output member being supported via a bearing disposed on an inner circumferential side of the cylindrical output member by the second carrier fixed to the case.

2. The vehicle power transmission device of claim 1, wherein the bearing is disposed to partially or entirely overlap with the output gear when viewed in a direction orthogonal to the axial center line.

* * * * *